United States Patent [19]
Edwards

[11] 3,846,320
[45] Nov. 5, 1974

[54] APPARATUS FOR REMOVING GREASE FROM POT LIQUIDS

[76] Inventor: Elizabeth G. Edwards, 1024 Fairwin Ave., Nashville, Tenn. 37216

[22] Filed: May 25, 1973

[21] Appl. No.: 363,813

[52] U.S. Cl. .............................................. 210/471
[51] Int. Cl........................................... B01d 35/28
[58] Field of Search .......................... 210/464–471, 210/495

[56] References Cited
UNITED STATES PATENTS

| | | | |
|---|---|---|---|
| 1,069,812 | 8/1913 | Ross.................................. | 210/465 |
| 1,325,613 | 12/1919 | Beebe................................. | 210/469 |
| 2,429,389 | 10/1947 | Calentine........................... | 210/471 |
| 2,457,441 | 12/1948 | Branchfield, Sr. ................. | 210/470 |
| 2,867,331 | 1/1959 | Bader................................. | 210/471 |
| 3,289,850 | 12/1966 | Gubash.............................. | 210/470 |

*Primary Examiner*—Samih N. Zaharna
*Assistant Examiner*—F. F. Calvetti
*Attorney, Agent, or Firm*—Clarence O'Brien; Harvey B. Jacobson

[57] ABSTRACT

A generally horizontal open framework is provided including a first generally straight side and a second arcuate side opening toward the first side. A shallow upwardly opening cup-shaped mesh panel is secured across the underside of the frame and one peripheral portion of the frame includes an upwardly projecting elongated handle. The handled frame with its cup-shaped mesh panel may be manipulated so as to dip the frame and the mesh panel down into a cooking pot and thereafter raise the frame and the mesh panel through the surface of the liquid in the pot in order to remove grease and other materials floating on top of the pot liquor.

3 Claims, 3 Drawing Figures

PATENTED NOV 5 1974         3,846,320

APPARATUS FOR REMOVING GREASE FROM POT LIQUIDS

The pot liquor skimming apparatus of the instant invention has been designed to facilitate the task of removing scum, grease, and other materials floating on the top of pot liquor. The apparatus includes a frame having a generally straight side and an arcuate side opening toward the first side. The maximum horizontal dimension of the frame may be generally half the diameter of the pot with which the apparatus is to be used and in this manner the pot skimming apparatus will have a plan area of generally one quarter of the plan area of the pot from which scum is to be removed from the pot liquor.

The main object of this invention is to provide an apparatus which may be readily used in skimming floating debris, such as grease and scum, from pot liquor.

Another object of this invention is to provide a pot liquor skimming apparatus constructed in a manner such that the skimming operation may be readily accomplished with little effort and without the requirement of more than average dexterity.

A further important object of this invention is to provide a pot liquor skimming apparatus that may be readily cleaned.

Another object of this invention is to provide an apparatus in accordance with the preceding objects including an upwardly projecting handle portion thereof which may be selectively positioned relative to the apparatus in order to facilitate use of the latter in conjunction with different size and shapes of pots.

A final object of this invention to be specifically enumerated herein is to provide an apparatus for removing grease and scum from pot liquor and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
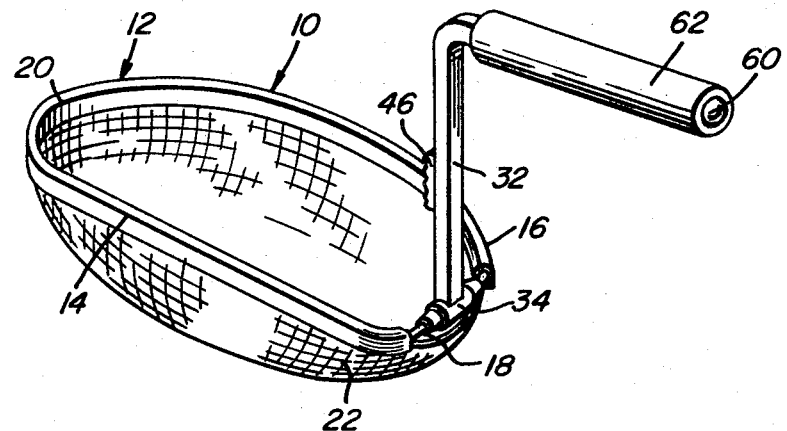
FIG. 1 is a perspective view of the pot liquor skimming apparatus of the instant invention.
Figure 2:
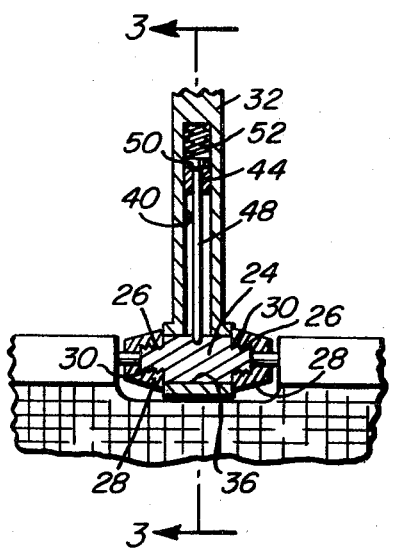
FIG. 2 is a fragmentary elevational view of the end of the skimming apparatus from which the handle is supported and with the base end portion of the handle and adjacent portions of the skimming apparatus illustrated in vertical section.

Referring now more specifically to the drawings, the numeral 10 generally designates the pot skimming apparatus of the instant invention. The apparatus 10 includes a generally horizontal frame referred to in general by the reference numeral 12 and it may be seen from FIG. 1 of the drawings that the frame 12 includes one substantially straight side 14 and an opposite arcuate side 16 opening toward the straight side 14. Further, the frame 12 includes a generally straight segment 18 extending between one end of the straight side 14 and the corresponding adjacent end of the arcuate side 16.

The end of the straight side 14 remote from the segment 18 curves smoothly into and merges with the adjacent end of the arcuate side 16 and the sides 14 and 16 may be formed as integral portions of a shaped downwardly opening U-shaped channel member 20 between whose opposite ends the segment 18 is secured.

A shallow upwardly opening cup-shaped mesh panel 22 is secured across the lower portions of the frame 12 and a cylindrical enlargement 24 is carried by the intermediate portion of the segment 18 and fixed thereon. The cylindrical enlargement 24 includes externally threaded diametrically reduced opposite end portions 26 and a pair of collars 28 are disposed on the opposite ends of the segment 18 and are provided with threaded counterbores 30.

An upstanding handle 32 is provided and the lower end thereof is provided with a transverse cylindrical head 34 having a bore 36 formed therethrough by which the lower end of the handle 32 is journaled on the cylindrical enlargement 24. The collars 28 are threaded onto the diametrically reduced end portions 26 and comprise thrust washers for the opposite ends of the head 34.

The lower end of the handle 32 is provided with a blind bore 40 which opens into the bore 36 and the inner side of the handle 32 includes a longitudinally extending slot 42 through which the stem portion 44 of a thumb-engageable tab 46 is slidingly received. A latch shaft 48 is slidably disposed in the bore 40 and passes through a bore provided therefor in the shank portion 44. The upper end of the shaft 48 is provided with a diametrically enlarged head 50 and a compression-spring 52 is disposed in the upper end of the counterbore 40 and bears downward against the head 50 so as to downwardly bias the head 50, the thumb-engageable tab 46 and the shaft 48.

Figure 3:
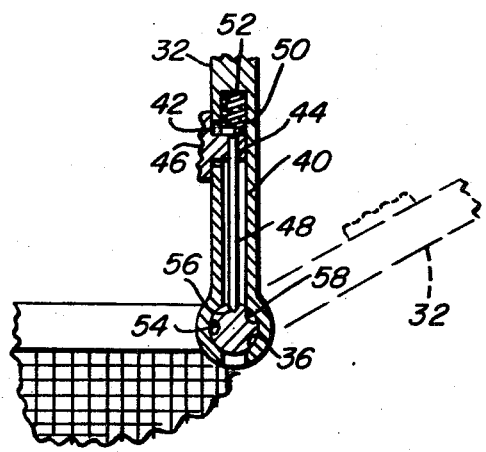
FIG. 3 is a vertical sectional view taken substantially upon the plane indicated by the section line 3—3 of FIG. 2.

The cylindrical enlargement 24 includes three circumferentially spaced and radially outwardly opening recesses 54, 56 and 58 in which the adjacent end of the latch shaft 48 is receivable. However, upon upward shifting of the thumb-engageable tab 46 against the biasing action of the spring 52, the lower end of the shaft 48 may be upwardly retracted out of the bore 36 so that the handle 32 may be rotated relative to the cylindrical enlargement 24. When the handle 32 is positioned as illustrated in solid lines in FIGS. 1 and 3 of the drawings, the lower end of the shaft 48 is registered with the recess 56 and the spring 52 biases the locking shaft 48 downwardly so that the lower end thereof seats in the recess 56 and thereby releasably locks the handle 32 into position. However, if it is desired to secure the handle 32 in an outwardly directed 45° inclined position, such as that illustrated in phantom lines in FIG. 3 of the drawings, the thumb-engageable tab 46 is urged upwardly against the biasing action of the spring 50 and rotated to the phantom line position after which the tab 46 may be released so that the spring 52 may downwardly bias the shaft 48 into position with its lower end seated in the recess 58. Still further, when the apparatus 10 is not in use, the handle 32 may be pivoted to and releasably locked in position disposed between the sides 14 and 16 and in generally coplanar relation with the frame 12.

Of course, from FIG. 1 of the drawings, it may be seen that the upper end of the handle 32 is provided with a laterally outwardly directed horizontal handgrip portion 60 having a suitable insulative covering 62 secured thereabout.

Although both sides of the frame 12 may be arcuate, it has been found most desirable to have one side, such as the side 14, generally straight and the other side, such as the side 16, arcuate and opening toward the side 14. Further, with the handle 32 supported from one end of the frame 12, the apparatus 10 may be more readily manipulated. Also, the laterally outwardly directed handgrip portion 60 further facilitates proper manipulation of the apparatus 10 in skimming floating materials from pot liquids.

The mesh panel 22 may be constructed of any suitable material, although a non-corrosive material of metal or plastic is preferred in the construction of the mesh panel 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for skimming grease from pot liquids, said apparatus comprising a generally planar open frame including a first generally straight side and a second arcuate side opening toward said first side, one pair of convergent ends of said sides being joined together and the other pair of ends of said sides being spaced apart and joined by means of a generally straight segment of the periphery of said frame extending therebetween, said straight segment comprising, at least in part, a pivot shaft portion, a shallow cup-shaped mesh secured across said frame and opening outwardly to one side thereof, an L-shaped handle including first and second generally right angled elongated members interconnected at one pair of corresponding ends, said L-shaped handle being disposed in a plane at generally right angles relative to the medial plane of said frame and having the free end of one of said elongated members pivotally supported from said pivot shaft portion for oscillation relative thereto about an axis extending longitudinally through said pivot shaft portion and disposed generally normal to the plane of said handle and transverse to said one elongated member, said one elongated member and said pivot shaft portion including releasable coacting latch means operative to retain said one elongated member in a first position disposed generally normal to the medial plane of said frame and with said one elongated member projecting outwardly of said one side of said frame, the other elongated member projecting outwardly of the free end of said one elongated member in a direction extending away from said one pair of ends of said sides.

2. The combination of claim 1 wherein said coacting latch means also includes means operative to retain said one elongated member in positions angulated approximately 45° relative to and on opposite sides of the first-mentioned position.

3. The combination of claim 1 wherein the length of said one elongated member is less than the length of said straight side and said one elongated member is swingable inwardly over said frame into collapsed position received within said frame.

* * * * *